E. BECH.
AUTOMATICALLY CLOSING VALVE.
APPLICATION FILED SEPT. 16, 1907.
914,547.
Patented Mar. 9, 1909.
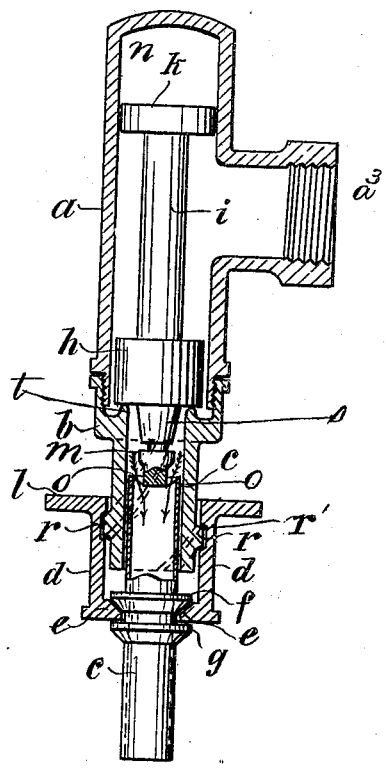

UNITED STATES PATENT OFFICE.

EDUARD BECH, OF COPENHAGEN, DENMARK.

AUTOMATICALLY-CLOSING VALVE.

No. 914,547.

Specification of Letters Patent.

Patented March 9, 1909.

Application filed September 16, 1907. Serial No. 393,144.

*To all whom it may concern:*

Be it known that I, EDUARD BECH, citizen of the Kingdom of Denmark, residing at Hyshenstrade 16, Copenhagen, Denmark, have invented certain new and useful Improvements in Automatically - Closing Valves; and I do hereby declare the following to be a full, clear, and exact description of the invention, such as will enable others skilled in the art to which it appertains to make and use the same.

My invention relates to self closing watercocks or valves and is especially intended to prevent jar or shock in their closing. To this end I make a screw-threaded connection between a part which moves up and down with said valve and a fixed casing, the pitch of the screw-threads being such that the weight of the valve when released will automatically cause the said part to descend following the path of said threads and delayed thereby, the said valve sharing in this delay and reaching its seat gradually and lightly without shock.

The accompanying drawing represents a valve and appurtenances embodying my invention, partly in vertical section and partly in side elevation.

The main casing of the valve is designated $a$ and has the form of a vertical cylinder rounded at the top and having a lateral tubular branch which is internally screw-threaded and constitutes a liquid inlet $a^3$. The lower end of this casing is open and externally screw-threaded engaging similar threads of a supplemental downwardly extending casing $b$, the upper part of which is enlarged and provided around the central bore with a raised annular valve seat $t$ for cylindrical valve $h$, having an upwardly extending stem $i$, on the upper end of which is a disk $k$ fitting the interior of main cylinder $a$ above said inlet. The space between the upper end of casing $a$ and said disk constitutes an air-cushion $n$ for the latter, so that the upward movement of the valve may cause no shock. The general operation of this valve is old and well-known. This valve has an integral downward extension $s$, preferably in the form of a cone terminating in a short broad cylindrical stud resting on an upwardly presented, approximately cup-form stud or block $w$ integral with the upper end of vertical outlet tube $c$, said upper end having openings $o$ surrounding the base of block $w$. The said part $s$ and upper end of tube $c$ are received within the central bore $m$ of the cylindrical lower part of supplemental casing $b$. This tube is provided with two fixed collars $f$ and $g$, which receive between them the annular inward flange $e$ of a valve-opening nut $d$ having at its upper end a milled integral grasping disk $l$ for convenience of turning and retention. The interior of this nut is provided with a helical groove $r'$, fitting a corresponding helical rib $r$ of the exterior of supplemental casing $b$, said groove and rib constituting a screw-threaded connection between these two parts, of such pitch that when left free the said nut will slowly descend under the action of gravity. To open the valve, the said nut is screwed to the right and held in its highest position by the hand of the operator.

To permit the valve to close, the operator releases the disk $l$, and the weight of parts $c$, $d$, $s$, $h$, $i$, $k$ causes them to automatically descend together. This descent is retarded by the spiral rib $r$ and spiral groove $r'$, so that the valve $h$ reaches its seat gradually and without shock. As the upper air-cushion $n$ prevents any sudden or rapid upward movement of the valve whether accidental or intentional and as the nut $d$ supporting said valve through tube $c$ is limited in the speed of its upward and downward movements by the screw-threaded connection above described, it follows that all movements of said valve must be gentle and noiseless. Its only normal automatic action is the descent for closure above explained.

Having thus described my invention what I claim as new and desire to secure by Letters Patent is:

1. In combination with a valve adapted to move vertically, a nut and intermediate parts supporting said valve, said nut engaging a fixed part by screw-threads of such a pitch that gravity will cause the descent of said valve and nut, retarded by said screw-threads on the release of said nut for the purpose set forth.

2. In combination with a valve adapted to move vertically, a discharge tube supporting said valve, a nut engaging said tube, and a fixed casing having a helical rib and groove connection with said nut, in order that the latter may lift the valve when turned in one direction by hand, but when released will descend by gravity, and in so doing turn on said casing following the line of said rib and groove and thus retarding the descent of the valve to prevent shock substantially as set forth.

3. In combination with an automatically opening and closing valve, a nut arranged to lift the same from its seat and to descend automatically under the influence of gravity permitting the closing of said valve.

4. In combination with a fixed part having spiral ribs, a nut engaging said ribs and adapted to descend by gravity automatically and gradually along the said ribs, an outlet tube descending with said nut, a valve closing said outlet tube and having a limited play to effect the same but moving with said tube and nut in the latter part of its descent and a plunger rising and falling with said valve under the action of the fluid supply and of gravity substantially as set forth.

In testimony whereof, I have signed my name to this specification in the presence of two subscribing witnesses.

EDUARD BECH.

Witnesses:
  JEAN PEDERSEN,
  CHARLES WILLIAMS.